July 17, 1956   A. WARSHER ET AL   2,755,048
MOUNT STRUCTURE FOR ELECTRIC COMPONENTS
Filed June 28, 1951
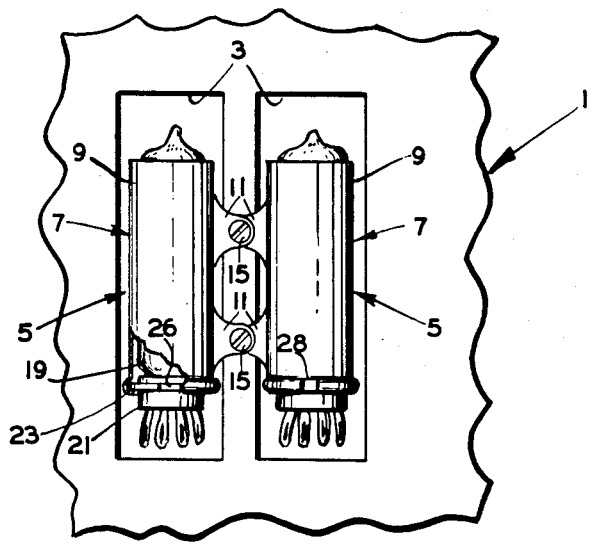
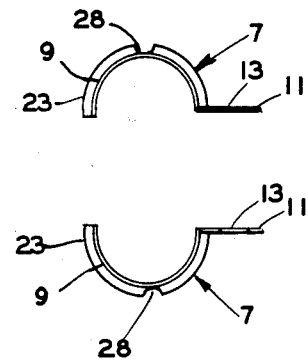
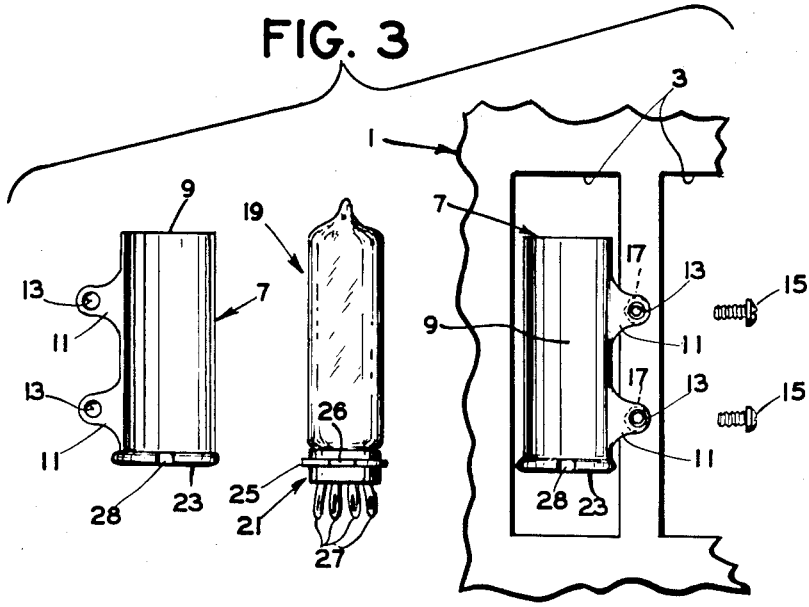
INVENTORS
ADOLPH WARSHER
PHILIP J. GUILLOT
BY
ATTORNEY United States Patent Office 2,755,048
Patented July 17, 1956

2,755,048

MOUNT STRUCTURE FOR ELECTRIC COMPONENTS

Adolph Warsher, Ridgewood, and Philip J. Guillot, Little Falls, N. J., assignors to Bendix Aviation Corporation, Teterboro, N. J., a corporation of Delaware Application June 28, 1951, Serial No. 234,012

9 Claims. (Cl. 248—27)

The invention relates to structure for mounting electric components, such as electron tubes and their associated sockets, on a chassis panel.

One object of the invention is to provide novel structure which shock-mounts both the tube and the tube socket and prevents accidental separation of the tube and socket.

Another object is to provide novel mount structure which adequately shields the tube from electrical interference and effectively cools the tube by providing metal-to-glass contact substantially throughout the entire area of the tube envelope for radiating heat from the tube and without reflecting heat back to the tube.

Another object is to provide novel mount structure which may be used with tubes of substantially any size and which facilitates removal of the tube from the chassis.

A further object is to provide novel mount structure which permits connections to be made to the socket connectors from both sides of the chassis panel.

Another object is to cheapen the cost of mount structure for electron tubes and to reduce the number of parts normally required for mounting a shielded tube and socket on a chassis panel.

The invention contemplates novel structure for mounting electrical components, such as an electron tube and its associated socket, on a chassis panel and comprises a pair of arcuate members adapted to receive the electrical components therebetween, and means for securing the members together and to a chassis panel.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

In the drawing,

Figure 1 is a plan view showing a novel mount structure constructed according to the invention and mounting a pair of tubes and associated sockets on a chassis panel;

Figure 2 is an end view of a disassembled mount structure; and

Figure 3 is an exploded view of a portion of the assembly shown in Figure 1.

Referring now to the drawing for a more detailed description of the novel mount structure of the present invention, shown therein is a chassis panel 1 having a pair of rectangular apertures 3 for receiving novel mount structures 5. Each mount structure comprises a pair of elements 7 formed of sheet material, such as stainless steel, which has spring qualities after formation and preferably resists high temperatures. Each element has a substantially semi-cylindrical portion 9 extending circumferentially approximately 185 degrees and a pair of tabs 11 extending from portions 9 and having openings 13 extending therethrough to receive screws 15 for securing elements 7 together and to chassis panel 1. Screws 15 may be threaded into one of the elements or into the chassis panel or into lock nuts 17 secured on the side of the panel remote from tabs 11. The elements are designed so that the tube envelope will not break irrespective of how tight screws 15 are drawn. As shown in Figure 1, a pair of mount structures may be secured by a single pair of screws 15 to the chassis panel.

An electron tube 19 assembled to its socket 21 is received in each aperture 3 and within portions 9 of pairs of elements and substantially the entire area of the tube envelope engages portions 9 to facilitate transfer of heat from the tube to the mount structure. Each element 7 preferably has a rolled lip 23 at one end to receive an annular flange 25 on the tube socket to prevent accidental separation of the tube from the socket. Flange 25 usually is cut away at intervals 26 and rolled lips 23 preferably have depressions 28 registering with the cut-away portions of the flange to locate the socket with the connectors in predetermined relationship to the chassis panel.

To provide for more efficient heat transfer from the tube to the mount structure, and to prevent reflection of heat back to the tube, the surfaces of elements 7 are tumble blasted and then are treated to produce a black oxide coating to give a dull black finish.

With the novel mount structure described, the tube and socket are maintained in assembly and the mount structure adequately shields the tube from electrical interference. Tabs 11 provide cantilever suspension for the mount structure and the tube is effectively shock-mounted on the chassis panel. Heat from the tube is effectively absorbed by the mount structure and radiated to the atmosphere.

Connections may be made to the connectors 27 on the tube socket from both sides of the chassis panel, thus effectively doubling the available area of the chassis panel.

The mount structure consists of a fewer number of parts than was required heretofore to mount a tube and socket on a chassis panel and adequately shield the tube from electrical interference.

The mount structure may be used for sub-miniature, miniature and full size tubes merely by changing the size of aperture 3 in the chassis panel to conform to the size of the tube and by forming elements 7 to conform to the radius and length of the tube.

The novel mount structure provides for more compact assembly of a tube and socket to a chassis panel because the axis of the tube extends substantially parallel to the chassis panel and the tube projects from the chassis panel a distance equal approximately to the radius of the tube, whereas with the mount structures used heretofore, the tube projects from the chassis a distance equal approximately to the length of the tube. This facilitates balancing the chassis panel where weight distribution is of consequence.

Although but one embodiment of the invention has been ilustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. An electron tube panel mounting, comprising a flat panel having a clearance opening; two resilient tube-supporting members each having a cylindrically curved tube-engaging face shaped to fit the side of a cylindrical electron tube, and means for securing said members to each other at one side only in radially yieldable relation and to said panel with the curved faces aligned and opposed and one face extending into said clearance opening to form a shock-absorbing mount for said tube extending into said panel.

2. An electron tube panel mounting, comprising a flat panel having a clearance opening, a cylindrical heat generating electron discharge tube fitting said opening, two resilient tube-supporting members of heat conducting metal, each having a cylindrical face whose axial dimension lengthwise of the tube is substantially greater than its radial width, shaped to fit the side of the tube and extending substantially the full length of said tube, and means for securing said members to each other at one side only in radially yieldable relation and to said panel with said faces aligned and opposed to form a substantially cylindrical shock-absorbing mount, extending over substantially the entire lateral area of the tube in heat-transferring contact therewith and projecting into said clearance opening in the panel.

3. An electron tube panel mounting for a cylindrical electron tube and an associated longitudinally separable socket having a laterally projecting flange, comprising two resilient tube-supporting members each having a cylindrically curved face shaped to fit a side of said tube, and socket-retaining means extending circumferentially along registering ends of said members in position to engage and retain said flange; and means for securing said members together and to a panel with said curved faces aligned and opposed in position to engage opposite sides of the tube, arranged to form a shock-absorbing tube mount and a tube socket retainer.

4. An electron tube panel mounting for a cylindrical tube and an associated longitudinally separable socket having a laterally projecting flange provided with a radially offset aligning element, comprising two resilient tube-supporting members each having a cylindrically curved face shaped to fit a side of the tube, retaining means on at least one resilient member positioned to extend across opposite sides of said flange for retaining the socket against longitudinal movement, aligning means on one of said resilient members for engaging the aligning element on the socket flange when the tube and socket are in aligned position, and means for securing said resilient members together at one side only in radially yieldable relation and to a panel with the curved faces in alignment and opposed, arranged to form a shock-absorbing socket-retaining mount for said tube and socket.

5. An electron tube panel mounting comprising a flat panel having a clearance opening, and shock-absorbing means for mounting a cylindrical electron discharge tube in said opening in axial alignment with the panel, including a pair of complementary tube-supporting members having opposed cylindrically curved faces shaped to fit opposite sides of the tube, formed of thin resilient metal extending in heat-transferring contact longitudinally along the tube surface, each member being provided with mounting means including a flange extending laterally from said cylindrical face across a portion of said aperture to the panel, and means for fastening superposed flanges of said members to the panel, said resilient metal members being radially yieldable to receive and engage the tube, and said flanges being yieldable in response to panel shock movements.

6. An electron tube panel mounting for a cylindrical tube and an associated longitudinally separable socket having a laterally projecting flange, comprising integral tube-supporting members of resilient metal, each having a cylindrically curved face shaped to fit a side of said tube, a mounting projection at one side and an integral recess adjacent an end, positioned to receive said flange; and fastening means connecting said mounting projections to each other and to a panel with the curved faces and recesses in alignment and opposed, and the opposite sides free for transverse movement, to form a radially yieldable shock-absorbing socket-retaining mount for said tube.

7. A mounting for two electron tubes, comprising two mounting units, each unit including two resilient tube-supporting members each having a cylindrically curved face adapted to fit the side of a cylindrical electron tube and a mounting extension at one side, said units being located with their mounting extensions in engagement and the curved faces of the members of each unit in alignment and opposed, the opposite sides of said members being free for lateral movement, arranged to form radially yieldable shock-absorbing mounts for two tubes, and a common fastener connecting the mounting extensions of both units to each other.

8. An electron tube panel mounting, comprising a panel having two mounting openings and including a mounting member extending between the openings, two mounting units each including two resilient tube-supporting members, each having a cylindrically curved face shaped to fit a side of a cylindrical electron tube and a mounting extension at one side, said members of each unit being located with the curved faces aligned and opposed, said extensions being connected to form a radially yieldable shock-absorbing mount for a tube, and a fastening element connecting the mounting extensions of both units to each other and to the panel mounting member with the units located in said openings.

9. An electron tube panel mounting, comprising a flat panel having two adjacent clearance openings separated by a narrow panel section, and shock-absorbing means for mounting two cylindrical electron discharge tubes in said openings in axial alignment with the panel, including two tube supports, each support comprising a pair of complementary tube-supporting members having opposed cylindrically curved faces shaped to fit opposite sides of a tube, formed of thin resilient metal adapted to extend in heat-transferring contact longitudinally along the tube surface, each member being provided with mounting means including a flange extending laterally from said cylindrical face across a portion of an aperture to said panel section, the flanges of said two tube supports being superposed, and means for fastening the superposed flanges of said supports to said section of the panel, said resilient metal members of each support being laterally yieldable to receive and engage a tube, and said flanges being yieldable in response to panel shock movements.

References Cited in the file of this patent

UNITED STATES PATENTS

| 247,860 | Warner | Oct. 4, 1881 |
| 894,116 | Choate | July 21, 1908 |
| 1,203,402 | Post | Oct. 31, 1916 |
| 1,328,488 | Bowden | Jan. 20, 1920 |
| 1,492,443 | Francis | Apr. 29, 1924 |
| 1,616,176 | Bremer | Feb. 1, 1927 |
| 1,965,202 | Roys | July 3, 1934 |
| 2,003,159 | Taylor | May 28, 1935 |
| 2,050,885 | Hafecost et al. | Aug. 11, 1936 |
| 2,353,363 | Sanford | July 11, 1944 |
| 2,500,301 | Tresise et al. | Mar. 14, 1950 |

FOREIGN PATENTS

| 24,064/29 | Australia | Mar. 29, 1931 |
| 30,337/30 | Australia | Nov. 25, 1930 |
| 350,471 | Great Britain | of 1930 |
| 469,239 | Great Britain | of 1937 |